Sept. 8, 1925.

J. T. McTARNAHAN 1,553,091

APPARATUS FOR FEEDING FUEL OIL AND AIR TO BURNERS

Filed May 11, 1923   5 Sheets-Sheet 1

INVENTOR:
John T. McTarnahan
BY Henry T. Williams,
ATTORNEY.

Sept. 8, 1925.
1,553,091
J. T. McTARNAHAN
APPARATUS FOR FEEDING FUEL OIL AND AIR TO BURNERS
Filed May 11, 1923
5 Sheets-Sheet 2

INVENTOR.
John T. McTarnahan
BY Henry T. Williams
ATTORNEY.

Sept. 8, 1925.

1,553,091

J. T. McTARNAHAN

APPARATUS FOR FEEDING FUEL OIL AND AIR TO BURNERS

Filed May 11, 1923     5 Sheets-Sheet 4

INVENTOR:
John T. McTarnahan
BY Henry T. Williams,
ATTORNEY.

Sept. 8, 1925. 1,553,091
J. T. McTARNAHAN
APPARATUS FOR FEEDING FUEL OIL AND AIR TO BURNERS
Filed May 11, 1923 5 Sheets-Sheet 5

INVENTOR:
John T. McTarnahan
BY Henry T. Williams
ATTORNEY.

Patented Sept. 8, 1925.

1,553,091

UNITED STATES PATENT OFFICE.

JOHN T. McTARNAHAN, OF BOSTON, MASSACHUSETTS, ASSIGNOR, BY MESNE ASSIGNMENTS, TO JOHN T. McTARNAHAN, INC., OF BOSTON, MASSACHUSETTS, A CORPORATION OF MASSACHUSETTS.

APPARATUS FOR FEEDING FUEL OIL AND AIR TO BURNERS.

Application filed May 11, 1923. Serial No. 638,285.

*To all whom it may concern:*

Be it known that I, JOHN T. McTARNAHAN, a citizen of the United States, residing at Boston, in the county of Suffolk and State of Massachusetts, have invented certain new and useful Improvements in Apparatus for Feeding Fuel Oil and Air to Burners, of which the following is a specification.

The invention to be hereinafter described relates to apparatus for feeding fuel oil and air to burners.

One of the purposes of the invention is to provide a simple, cheap, compact organization, the parts of which may be assembled in their appropriate relation prior to shipment to the place of use.

In carrying the invention into practical effect, in the present instance, the cup of a strainer device, the casing for a gear pump, the casing for transmission gears and fuel oil conducting passages are formed in one unit, and desirably in a single casting.

It is necessary from time to time to remove the strainer from its cup for the purpose of cleaning the same or for the purpose of substituting a new one for an old one. The construction is such that ready access may be had to the strainer and the cup for these purposes without disturbing other parts of the apparatus.

It is desirable that the fuel oil shall be fed to the burner or burners at different pressures under varying conditions. The construction is such that the pressure of the fuel oil may be quickly and easily varied as required, simple means being provided for indicating the pressures.

With the aforesaid and other purposes in view, the character of the invention will be best understood by reference to the following description of one good form thereof shown in the accompanying drawings, wherein:

Fig. 4 is a detail to be referred to;

Figure 9:
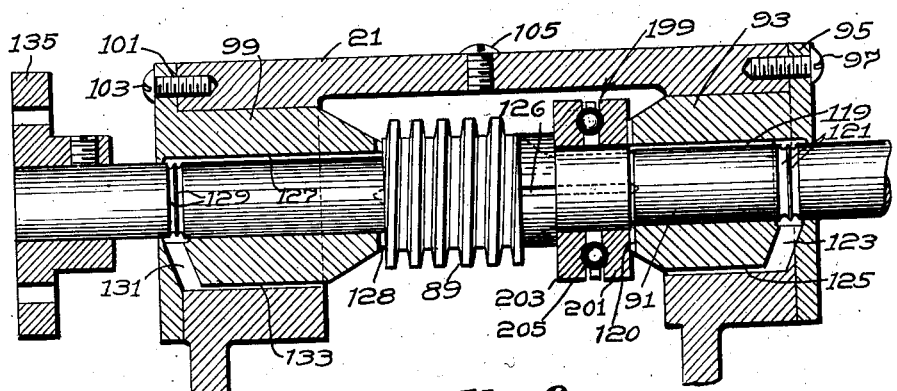

Fig. 9 on an enlarged scale is a vertical section through the worm shaft between the motor and the fan.

Referring to the drawings, the apparatus shown therein as one good form of the invention, comprises a support desirably in the form of a plate 1 provided with a drainage groove 3 having an outlet normally closed by a plug 4. The plate has necks 5 threaded to receive legs (not shown) desirably of pipe form.

Mounted on the plate 1 is an electric motor 7 secured to said plate by screw bolts 9. Since said motor is of usual construction, it is unnecessary to show and describe the same in detail herein.

A casting or block 11 (Figs. 1, 5, 6 and 7) has a base 13 secured by screw bolts 15 to the plate 1. This casting is formed to provide a strainer cup 17, a gear pump casing 19 and a gear casing 21. A passage 23 in the casting serves to conduct fuel oil from the strainer cup to the pump casing. A passage 25 in the casting extends from the pump casing to a valve housing 27 also formed in the casting, and a passage 29 leads from the housing to an outlet neck 31 tapped to receive an end of a pipe for returning the excess fuel oil to the fuel oil supply tank. The casting is formed to provide a neck 33 tapped to receive an end of a pipe for conducting fuel oil from the source of supply to the strainer cup. Also, the casing is formed to provide a neck 35 which is tapped to receive an end of a pipe for conducting the fuel oil from the passage 25 to the fuel oil burner. Since the latter may be of usual construction, it is unnecessary to show and describe the same herein.

Mounted in the strainer cup 17 is a strainer 37 of basket form having at its upper end a ring 39 which rests on an internal flange 41 formed in the cup. A curved wire spring 43 has one end secured to the ring 39 and projects upward therefrom for a purpose to be described.

The strainer cup may be provided with a cover 45 having a reduced portion 47 adapted to fit within the cup. To detachably secure the cover to the cup, a pair of studs 49 may have lower reduced ends threaded into the cup and upper reduced ends threaded to receive nuts 51. A clamp bar 53 has an eye 55 at one end thereof swivelled in one of the studs 49, and a hook 57 on the opposite end thereof for engagement with the other stud 49. Threaded in a bore in the middle of the clamp bar is a screw 59 provided with a handle 61.

The construction is such that after the basket strainer has been introduced into the cup, the cover may be placed thereon. Then the clamp bar may be swung over the cover to bring the hook 57 in engagement with one of the studs 49, and the handle 61 may be turned to cause the screw 59 to press the cover down into tight engagement with the cup. The under side of the cover will press down the wire spring 43, and thereby hold the strainer ring 39 securely against the internal flange 41 of the cup.

When it is desired to remove the strainer from the cup, it is merely necessary to release the screw 59 from the cover and swing the clamp bar 53 to one side. Then the cover may be lifted from the cup, and the wire spring 43 may be grasped as a handle to lift the strainer from the cup.

Figure 3:
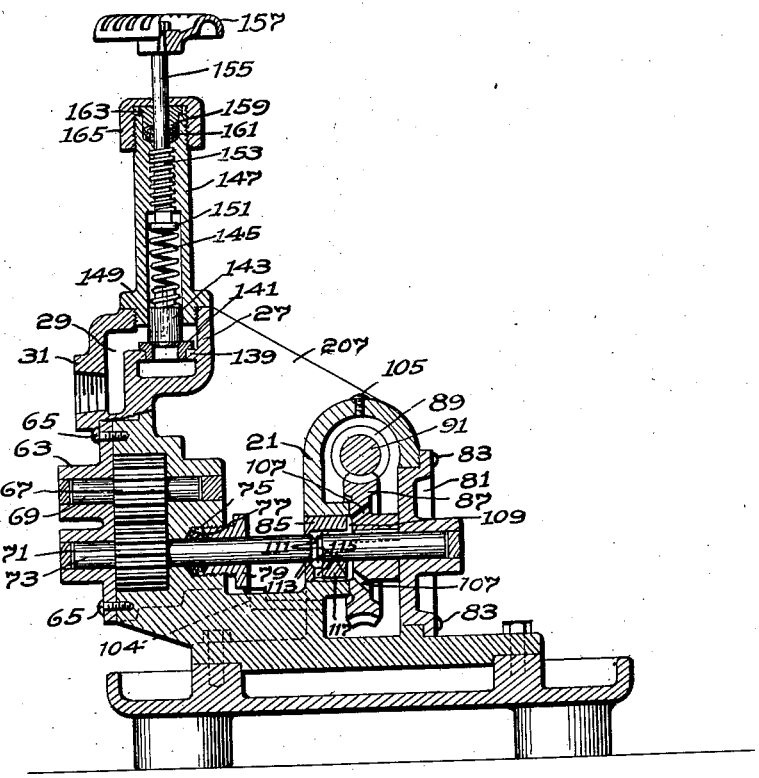
Fig. 3 is a vertical section taken on line 3—3 of Fig. 1.
Figure 4:
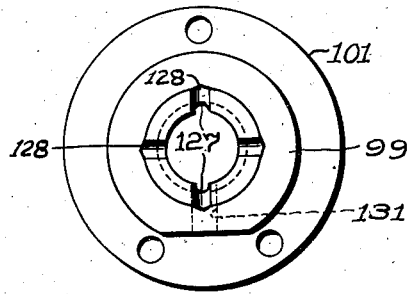
Figure 5:
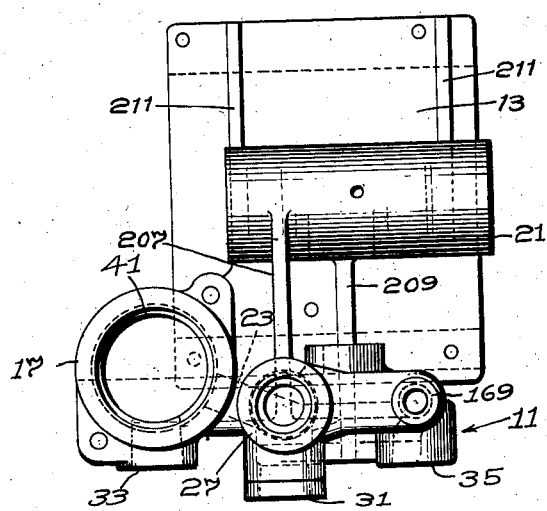
Fig. 5 is a plan of the casting in which are formed the strainer cup, pump casing, gear casing and fuel oil conducting passages.
Figures 6, 7:
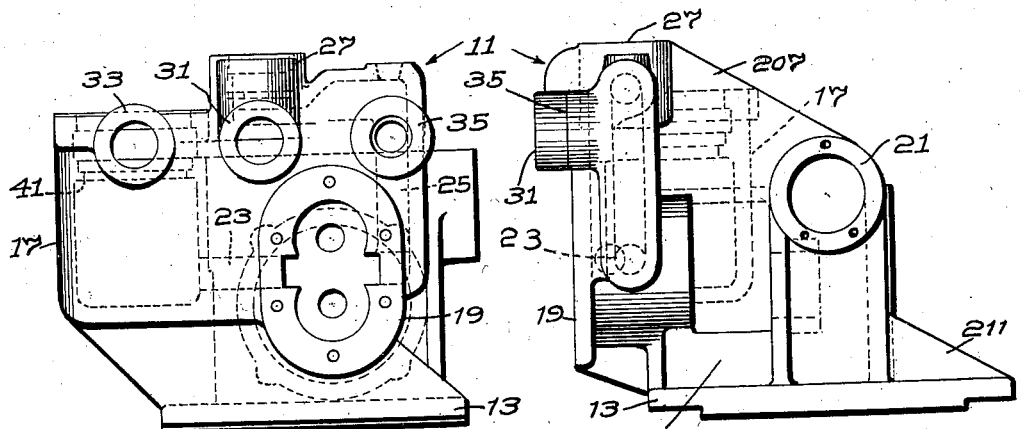
Fig. 6 is a side elevation of the casting.
Fig. 7 is an end elevation of the casting.

The pump casing 19 may be provided with a cover 63 (Fig. 3) secured to the casing by screws 65. Mounted in the casing is a spur gear 67 fast on a stud shaft 69 journalled in bearings formed in the casing and cover. Also mounted in the casing is a spur gear 71 meshing with the gear 67 and fast on a shaft 73 journalled in bearings in the casing and cover. To prevent leakage of oil along the shaft 73 from the casing, the latter is formed to present a counterbore 75 in which is a suitable packing 77 confined by a gland 79.

The shaft 73 projects from the pump casing into the gear casing 21 referred to, which is provided with a cover 81 secured by screws 83 to the casing. The shaft 73 is journalled in a bushing 85 and in a bearing formed in the cover 81. A worm gear 87 is mounted in the casing 21, and is fast on the shaft 73.

Figure 1:
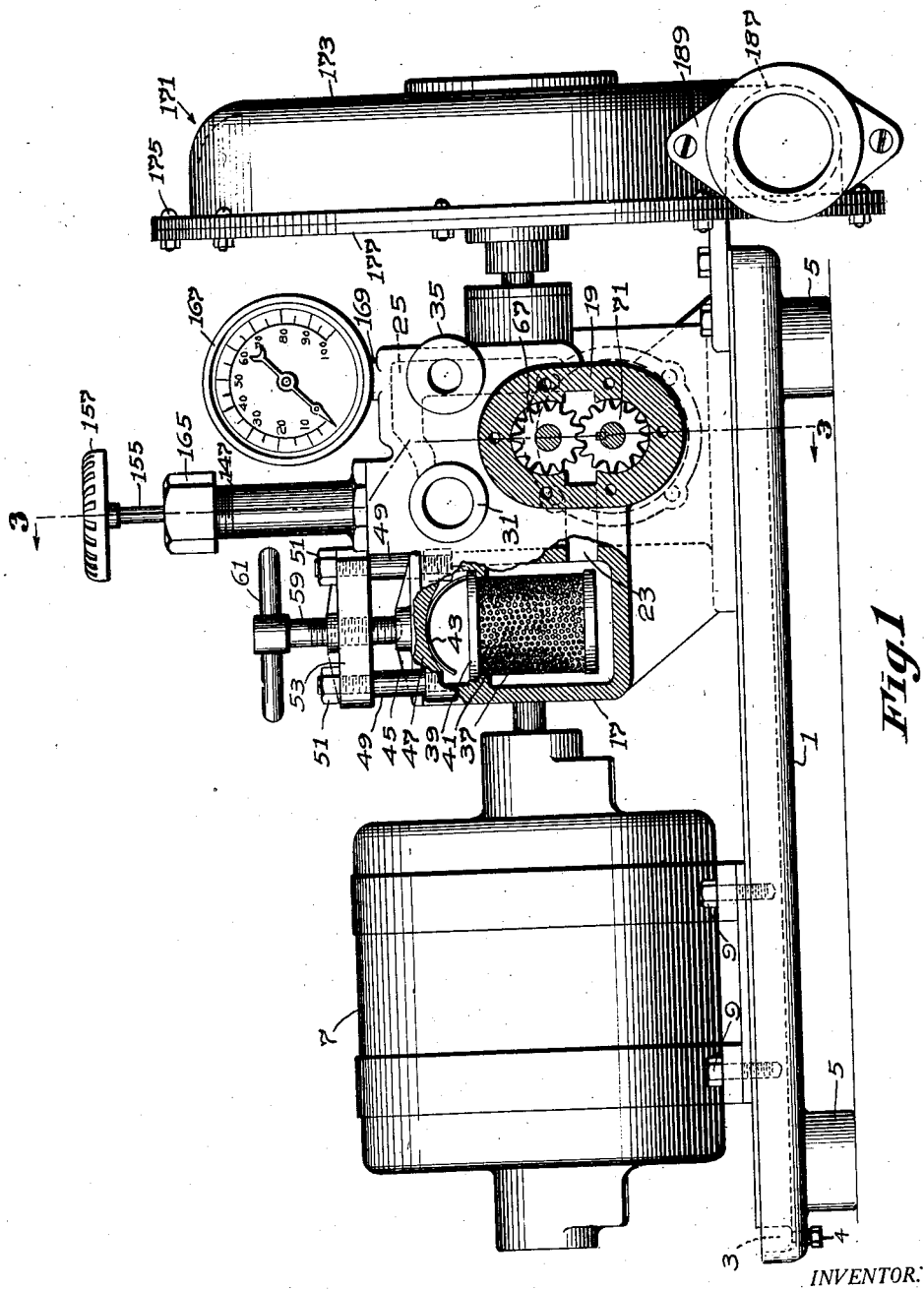
Fig. 1 is a side elevation of apparatus embodying the invention, certain parts appearing in vertical section.
Figure 2:
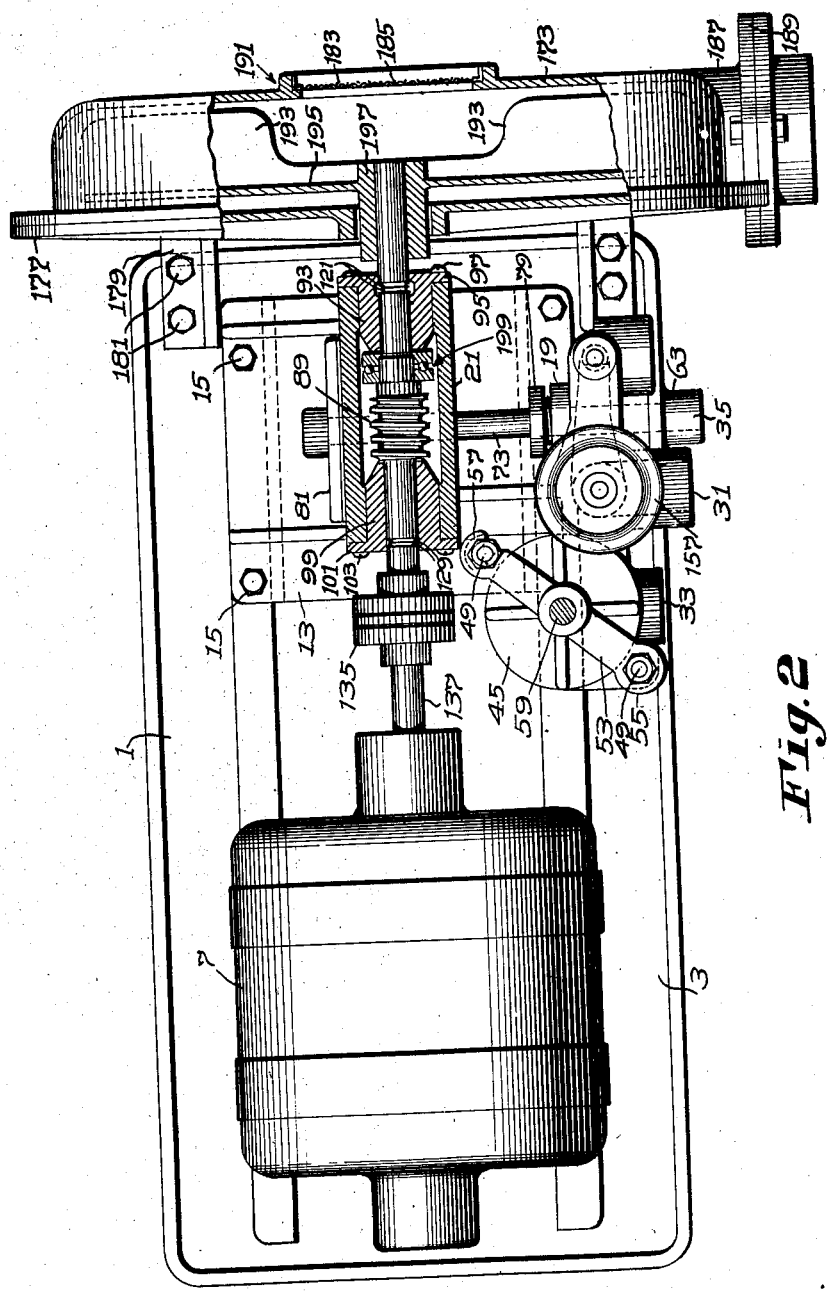
Fig. 2 is a plan of the apparatus, certain parts appearing in horizontal section.

The worm gear 87 meshes with a worm 89 in the casing and on a shaft 91 (Figs. 2, 3 and 9) journalled in a bushing 93 fitted into one end of the casing 21 and having an outstanding flange 95 secured by screws 97 to the casing. The shaft 91 is also journalled in a bushing 99 fitted into the opposite end of the casing and having an outstanding flange 101 secured by screws 103 to the casing.

Oil for lubricating the worm and worm gear and their shafts may be supplied to the casing 21 through an oil cup 104 connected to said casing adjacent the bottom thereof. A screw plug 105 in a hole in the top of the casing may be removed to allow air to escape from the casing. To lubricate the bushing 85 and prevent leakage of oil out from the casing between the bushing 85 and the shaft 73, the worm gear 87 may be provided with transverse ports 107, communicating with a recess 109 in one side of the gear. A pair of longitudinal grooves 111 are formed at the inside of the bushing, and extend between the gear recess 109 and circumferential grooves 113 formed in the shaft 73. A radial port 115 in the bushing communicates with a longitudinal groove 117 formed by slabbing off the outer side of the bushing.

The construction is such that oil may be supplied through the cup 104 to the casing 21 and rise to the level of the cup. The oil will be carried up by the worm gear and pass through the gear ports 107, the recess 109 and the grooves 111 in the bushing to the circumferential grooves 113 in the shaft. The oil is thrown thence outward by centrifugal force through the port 115 and the groove 117 back into the casing. Thus, the oil follows the path of least resistance which is back into the casing instead of along the shaft out from the casing. This eliminates the necessity of having a gland and packing to prevent leakage of oil from the casing 21 out along the shaft 73. As a result, the pump casing 19 and the gear casing 21 may be formed in the casting in close relation, thereby contributing to the compact organization of the unit.

To lubricate the worm shaft bearings in the bushings 93 and 99, the bushing 93 is formed to present internal longitudinal grooves 119 (Fig. 9) extending between radial grooves 120 in the bushing and circumferential grooves 121 in the worm shaft 91. The longitudinal grooves also communicate with a radial port 123 in the bushing which leads to an external longitudinal groove 125 formed by slabbing off the outer side of the bushing. Grooves 126 in the shaft facilitate passage of oil to the bushing grooves 120 and 119. The construction is such that oil in the casing carried by the worm gear to the worm, may flow along the shaft to the grooves 120 and 119 and thence to the circumferential grooves 121 which throw the oil outward by centrifugal force into the port 123 and through the external groove 125 back into the casing.

Similarly, the bushing 99 is provided with internal longitudinal grooves 127 extending between radial grooves 128 in the bushing and circumferential grooves 129 in the worm shaft 91 which communicate in turn with a radial port 131 in the bushing leading to a longitudinal external groove 133 formed by slabbing off the outer side of the bushing. The construction is such that oil may be carried by the worm toward the bushing and to the radial grooves 128 and flow thence along the grooves 127 to the circumferential grooves 129, and be thrown outward therefrom by centrifugal force into the port 131, and thence through the external groove 133 back into the casing.

The provision of this construction for lubricating the worm shaft eliminates the necessity of glands and packing to prevent leakage of oil from the casing, and further contributes to the compact organization.

The shaft 91 may be connected by a flexible coupling 135 (Fig. 2) with the shaft 137 of the electric motor. The construction is such that the motor will rotate the worm shaft and worm, and the latter through the worm gear and the shaft 73 will drive the spur gears of the pump. The pump will establish suction or a partial vacuum in the oil cup 17 which will draw fuel oil through the fuel oil inlet neck 33 into the cup above the basket strainer. The fuel oil will be drawn thence downward through the basket strainer into the space between the cup and strainer, and the fuel oil will be forced by the pump through the passage 25 to the neck 35 connected to the pipe for supplying the fuel oil to the burner or burners. The excess oil will flow on through the passage 25 past the neck 35 into the valve housing 27 and thence through the port 29 out through the neck 31 which is connected to the pipe for returning the excess oil to the fuel oil supply tank.

To vary the pressure of the fuel oil delivered to the burner or burners, the housing 27 may be formed to present an internal flange 139 (Fig. 3) adapted to receive a valve seat 141. Co-operating with this seat is a valve 143 which is pressed by a coil spring 145 mounted in a neck 147 having a reduced end 149 threaded into the valve housing 27. The coil spring is confined between the valve and a button 151 at the lower end of the screw 153 threaded into the neck 147. A stem 155 projects upward from the screw, and is provided with a handle 157. To prevent leakage of oil up along the stem out of the neck, the latter has a counterbore 159 receiving suitable packing 161 confined by a gland 163 and a cap 165 threaded on the upper end of the neck.

The construction is such that by adjustment of the screw 153, the tension of the spring 145 may be varied, thereby to vary the pressure of the valve 143 in opposition to passage of oil from the passage 25 between the valve seat and valve and through the port 29. The consequence is that the pressure of the oil in the passage 25 delivered to the burner or burners will be varied.

To indicate the pressure of the oil in the passage 25, a gage 167 (Fig. 1) may be provided in communication with a neck 169 for establishing communication between the passage 25 and the gage. Since the latter may be of usual construction, it is unnecessary to show and describe the same in detail herein.

Figure 8:
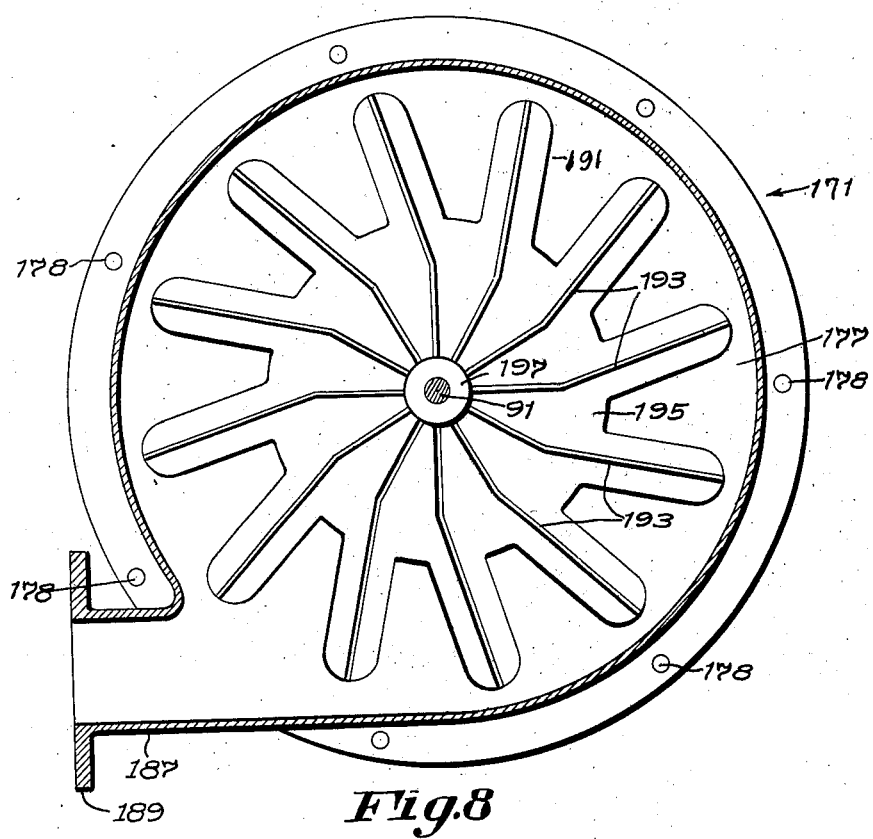
Fig. 8 is a vertical section through the fan casing.

The apparatus may also include means for forcing air to the burner or burners for the purpose of breaking up and atomizing the fuel oil delivered from the burners. To this end a fan 171 (Figs. 1, 2 and 8) may be provided comprising a body 173 secured to a cover plate 177 by bolts 175 entered through holes 178 in said plate. The body has feet 179 (Fig. 2) projecting rearwardly therefrom and secured by screw bolts 181 to the support plate 1 referred to. The body 173 may have an air inlet aperture 183 provided with a screen 185, and said body may be provided with an outlet neck 187 having a flange 189 adapted for connection with the air conducting pipe leading to the burner or burners. The bolts 175 may be removed and the casing body may be rotatively adjusted to present the outlet neck at the most convenient position.

Mounted in the fan casing is a runner 191 having vanes 193 projecting laterally from a web 195 on a hub 197. This hub is fast on a portion of the worm shaft 91 which projects outward beyond the gear casing 21 into the fan casing.

The construction is such that the motor will not only serve to drive the pump gears, but also will serve to rotate the fan runner.

The runner has a reaction which tends to shift the shaft 91 axially away from the motor. To resist this tendency, an end thrust bearing 199 (Figs. 2 and 9) may be provided comprising a ring 201 loose on the shaft 91 and a ring 203 fast on said shaft, said rings being provided with raceways receiving balls 205. The construction is such that the end thrust bearing will resist the tendency of the fan to shift the shaft 91 away from the motor and with a minimum amount of friction.

To contribute to the strength of the casting it may be formed to present a web 207 rising from the base 13 and extending from the gear casing to the valve housing, a web 209 rising from the base and extending from the pump casing to the gear casing, and webs 211 rising from the base to the gear casing.

There are important advantages in the fuel oil burning apparatus disclosed herein. The strainer cup, the pump casing, the gear casing, the pressure regulating valve housing, the passage connecting the cup with the pump casing and the passage connecting the pump with the valve housing, may all be formed in one compact unit or casting, so that these parts are permanently in their proper relation. As a result, the necessity for assembling the same is eliminated, and no pipes or unions or joints are provided.

When it is desired to remove the basket strainer from its cup for the purpose of cleaning the same or substituting a new one for an old one, this may be readily and quickly accomplished by removing the cup cover which exposes the basket strainer, and enables the operator to grasp the spring handle and lift the basket strainer from the cup. In doing this, none of the other parts of the apparatus is disturbed.

The valve in the housing at the juncture of the passage 25 and the port 29 is pressed by the spring towards its seat in opposition to the forced feed of the fuel oil past said valve, and the pressure of the fuel oil may be quickly and easily regulated by varying the tension of the spring which acts on the valve. The pressure of the fuel oil in the passage 25 may be readily seen by means of the pressure gage. Since the oil is conducted to the burner through the outlet neck which is located intermediate the pump and the valve, the pressure of the oil fed to the burner will be the same as that indicated by the gage.

The means for preventing leakage of oil along the worm gear shaft from the gear casing, is constructed and arranged so that it is located within said casing, and does not project outward beyond the same. As a consequence, the gear casing and the pump casing may be formed in the casting closely adjacent to each other, thereby contributing to the compact construction.

The apparatus disclosed herein is simple and cheap in construction, and is efficient and reliable in operation.

It will be understood that the invention is not limited to the specific embodiment shown, and that various deviations may be made therefrom without departing from the spirit and scope of the appended claims.

What is claimed is:

1. Apparatus of the character described comprising, in combination, a strainer cup, a gear pump casing, a transmission gear casing and a valve housing, all formed in one casting, the latter having a passage between the cup and pump casing and a passage between the pump casing and the valve housing, a valve in the latter, spring means pressing on the valve, and means for varying the pressure of the spring means, thereby to vary the pressure on the fuel oil flowing through the passage between the pump casing and the valve housing.

2. Apparatus of the character described comprising, in combination, a strainer cup, a gear pump casing, a transmission gear casing and a valve housing all in one unit, a strainer in the cup, intermeshing spur gears in the pump casing, a worm gear and a worm meshing therewith in the gear casing, a shaft extending from the pump casing to the gear casing and having one of the pump gears and the worm gear thereon, said unit having a passage connecting the cup with the pump casing and a passage connecting the pump casing with the valve housing, and valve means in the valve housing for regulating the pressure of fluid passing through the passage between the pump casing and the valve housing.

3. Apparatus of the character described comprising, in combination, a casting having a fuel oil inlet for receiving fuel oil from a source of supply, a fuel oil outlet for delivering oil to a burner, a fuel oil outlet for returning fuel oil to the source of supply, a cup communicating with the fuel oil inlet, a pump casing, a passage between the cup and the pump casing, and a passage leading from the pump casing to the fuel oil delivery outlet; a strainer mounted in the cup, and intermeshing gears in the pump casing for feeding the fuel oil from the cup through said passages.

4. Apparatus of the character described comprising, in combination, a casting having formed therein a strainer cup, a gear pump casing, a worm and worm gear casing, a passage connecting the cup with the pump casing, and a passage leading from the pump casing; a strainer mounted in said cup; covers for the cup, pump casing and gear casing, said pump casing and its cover having bearings therein, said gear casing and its cover having bearings therein, a pair of intermeshing spur gears in the pump casing, a worm gear and a worm in the gear casing, and a shaft journalled in the bearings in said casings and covers and carrying one of the pump gears and the worm gear.

5. In apparatus of the character described, a casting formed to provide a strainer cup, a gear pump casing, a transmission gear casing, a passage establishing communication between the cup and pump casing, an outlet and a passage establishing communication between the pump casing and the outlet.

JOHN T. McTARNAHAN.